United States Patent
Messer et al.

(10) Patent No.: US 7,153,488 B2
(45) Date of Patent: Dec. 26, 2006

(54) SUPPRESSION OF THE FORMATION OF NOXIOUS SUBSTANCES DURING CHLORIDE PROCESSES

(75) Inventors: Thomas Messer, Columbia, MD (US); Peter Carter, Grimsby (GB)

(73) Assignee: Millennium Inorganic Chemicals, Inc., Houston, TX (US)

(*) Notice: Subject to any disclaimer, the term of this patent is extended or adjusted under 35 U.S.C. 154(b) by 233 days.

(21) Appl. No.: 10/910,203

(22) Filed: Aug. 3, 2004

(65) Prior Publication Data

US 2006/0039845 A1 Feb. 23, 2006

(51) Int. Cl.
- B01D 53/00 (2006.01)
- B01D 53/24 (2006.01)
- C01G 23/00 (2006.01)

(52) U.S. Cl. .......................... 423/610; 423/77; 423/79; 423/215.5

(58) Field of Classification Search ................ 423/610, 423/215.5, 77, 79; 422/129, 168, 176, 187, 422/207

See application file for complete search history.

(56) References Cited

U.S. PATENT DOCUMENTS

| | | | | |
|---|---|---|---|---|
| 3,595,395 | A * | 7/1971 | Lorenzen | 210/169 |
| 4,066,424 | A | 1/1978 | Kilgren et al. | 55/71 |
| 4,234,446 | A * | 11/1980 | Ramras | 252/187.21 |
| 4,247,531 | A * | 1/1981 | Hicks | 423/477 |
| 5,431,346 | A | 7/1995 | Sinaisky | |
| 5,679,131 | A * | 10/1997 | Obushenko | 75/435 |
| 6,080,281 | A | 6/2000 | Attia | |
| 6,315,870 | B1 | 11/2001 | Tabatabaie-Raissi et al. | |
| 6,328,938 | B1 * | 12/2001 | Taylor et al. | 423/79 |
| 6,334,936 | B1 | 1/2002 | Tabatabaie-Raissi et al. | |
| 6,426,312 | B1 | 7/2002 | Lush | |
| 6,585,863 | B1 | 7/2003 | Davydov et al. | |
| 6,616,815 | B1 | 9/2003 | Kato et al. | |
| 6,772,595 | B1 | 8/2004 | Martling et al. | |
| 6,811,721 | B1 | 11/2004 | Taylor et al. | |

FOREIGN PATENT DOCUMENTS

| | | |
|---|---|---|
| DE | 41 09 991 C1 | 6/1992 |
| EP | 0 063 555 | 4/1982 |
| EP | 0 258 756 | 8/1987 |
| WO | WO 87/00157 | 1/1987 |
| WO | WO 92/17245 | 10/1992 |

OTHER PUBLICATIONS

PCT International Search Report and PCT Written Opinion of International Searching Authority (Apr. 20, 2006).

* cited by examiner

Primary Examiner—Timothy C. Vanoy
(74) Attorney, Agent, or Firm—Kalow & Springut LLP; Kevin M. Carroll

(57) ABSTRACT

The present invention is directed to the suppression of the formation noxious compounds such as furans. According to the present invention, a venturi device is used to rapidly quench a chlorinator reaction gas. The rapid quench minimizes the resonance time that furan precursors are at conditions conducive to furan formation.

13 Claims, No Drawings

SUPPRESSION OF THE FORMATION OF NOXIOUS SUBSTANCES DURING CHLORIDE PROCESSES

FIELD OF THE INVENTION

The present invention relates to the suppression of the formation of noxious substances during industrial chloride processes.

BACKGROUND OF THE INVENTION

Naturally occurring ores, particularly ores that contain metallic oxides, are routinely mined, purified and used in diverse applications. For example, ores that contain titanium oxides may be mined and purified to generate titanium dioxide that is suitable for use in paper, plastics and coatings applications, as well as in applications such as sunscreens and photocatalysts.

The two most common processes for purifying ores such as ores that contain titanium oxides are the chloride process and the sulfate process. Both of these processes are well known to persons skilled in the art. The chloride process, which is the more widely used of these two processes, requires reacting titania ore with gaseous chlorine to form titanium tetrachloride, then cooling and purifying the titanium tetrachloride to remove impurities, such as impurity chlorides and other noxious substances that are present in the chlorinated ore.

After one removes the impurity chlorides and other noxious substances, the purified titanium tetrachloride is oxidized to produce a base pigmentary particle of titanium dioxide. This base pigmentary particle of titanium dioxide may be further processed and/or treated to make a final pigment product and used in the aforementioned applications.

Through the chloride process, each year significant amounts of commercially acceptable titanium dioxide are generated around the world. However, as noted above, when generating commercially acceptable titanium dioxide, impurity chlorides and other noxious substances are also generated.

Among the noxious substances that are generated during chloride processes are dioxins, furans, benzo furans and other similar compounds. These substances are collectively referred to herein as "furans." Examples of furans include, but are not limited to compounds that comprise: (i) the total PCDD, which include 2,3,7,8-TCDD; 1,2,3,7,8-PeCDD; 1,2,3,4,7,8-HxCDD; 1,2,3,6,7,8-HxCDD; 1,2,3,7,8,9-HxCDD; 1,2,3,4,6,7,8-HpCDD; and 1,2,3,4,5,7,8,9-OCDD; as well as (ii) the total PCDF, which include 2,3,7,8-TCDF; 1,2,3,7,8-PeCDF; 2,3,4,7,8-PeCDF; 1,2,3,4,7,8-HxCDF; 1,2,3,6,7,8-HxCDF; 2,3,4,6,7,8-HxCDF; 1,2,3,7,8,9-HxCDF; 1,2,3,4,6,7,8-HpCDF; 1,2,3,4,7,8,9-HpCDF and 1,2,3,4,6,7,8,9-OCDF. The literature describes these compounds as being particularly dangerous because they are carcinogens and mutagens.

Of these substances, the dioxin, 2,3,7,8-TCDD (2,3,7,8-tetrachlorodibenzo-p dioxin) is the most infamous. It is comprised of chlorine and organic materials and is more commonly known as the toxic component of Agent Orange.

In the chloride process, the formation of furans occurs during the cooling of the chlorinator reaction gas. Unfortunately, for a number of reasons, the conditions under which this cooling takes place are particularly conducive to the formation of furans.

First, the presence of coke, fly ash, finely divided solids and chlorine facilitates furan formation.

Second, the process for cooling chlorinator reaction gases exposes the precursors of furans to a temperature that is conducive to furan formation for a relatively long period of time. In this process, gas exiting a chlorinator is usually at a temperature in the range of approximately 800° C. to 1000° C. However, the components of this gas must be cooled to a sufficiently low temperature before the impurities can be separated from the titanium tetrachloride.

Typically, the chlorination gas must be cooled by several hundred degrees. For example, the temperature may need to be reduced to a temperature that is desirable for use in a downstream separating apparatus, e.g., when using a cyclone, it may be desirable to operate in a temperature range of approximately 260°–265° C. Unfortunately, furan formation is most significant in the temperature range of between 300° C. and 400° C., a temperature range through which the chlorinator reaction gas must pass when being cooled to the temperature at which separation is possible.

Moreover, the more commonly used methods for cooling chlorination reactor gases, which include using a spray drier or crudely atomized titanium tetrachloride sprayed directly into a hot conveying duct, permit the chlorinator precursors to remain in the temperature range of 300° C.–400° C. for a relatively long amount of time. As persons skilled in the art are aware, a spray drier has a relatively slow rate of cooling that allows for the formation of furans when the precursors to the furans pass through the above-described formation temperature zone.

Similarly, in methods that use direct spraying into the conveying duct, the rate of cooling of the gas stream depends on the degree of atomization of the crude titanium tetrachloride, and due to the nature of crude titanium tetrachloride, which contains impurity solids, such as ore and coke fines, it is not practical to design a spray that discharges small enough droplets to cool the gas stream rapidly enough to prevent furan formation effectively. Thus, these cooling technologies slow the rate of cooling, which leaves the precursors exposed to furan forming temperatures for an extended time.

Third, known cooling processes facilitate the build up of metal chlorides and other impurities on the walls of the outlet ducts, thereby narrowing the ducts. This build up increases the generation of the furans in two ways: (a) it causes a certain amount of the precursors of the furans to remain in the duct for an extended period, thereby extending their time being subjected to the furan formation conditions; and (b) it narrows the lumen of the duct so that the precursors that are not affixed to the walls of the duct nonetheless travel through the duct more slowly.

Each of the aforementioned practicalities of the chloride process contributes to the formation of furans during industrial chloride processes. Unfortunately, to date there has been no satisfactory way to avoid these problems.

Recently governmental agencies around the world that are charged with regulating environmental issues have begun to focus their attention on the emission of furans. They have reduced the level of acceptable emissions, and are contemplating reducing them further. Thus, the issue of furan formation is becoming increasingly significant for commercial producers of titanium dioxide.

Accordingly, it would be desirable to provide cost-effective means for reducing furan emissions. The present invention addresses this problem.

SUMMARY OF THE INVENTION

The present invention is directed to the suppression of the formation of noxious substances that are generated during chloride processes. By rapidly cooling chlorination reaction gas products under sufficiently turbulent conditions, the formation of these compounds may be suppressed.

According to one embodiment, the present invention provides an apparatus for suppressing the formation of noxious compounds during $TiO_2$ production, wherein said apparatus is comprised of:
  (a) a chlorinator, wherein said chlorinator is comprised of an outlet duct; and
  (b) a nozzle located within said outlet duct, wherein said nozzle is comprised of a converging section and a diverging section.

According to a second embodiment, the present invention provides a process for suppressing the formation of noxious compounds produced during $TiO_2$ production, wherein said process comprises the steps of:
  (a) permitting a chlorinator reaction gas to enter a nozzle, wherein said nozzle is comprised of a converging section and a diverging section;
  (b) permitting said chlorinator reaction gas to pass from said converging section of said nozzle to said diverging section of said nozzle;
  (c) introducing a temperature reducing substance into said nozzle thereby cooling said gas to form a mixture comprised of solids and a gas; and
  (d) separating said solids from said gas.

According to a third embodiment, the present invention provides a process for suppressing the formation of furans during $TiO_2$ production, wherein said process comprises the steps of:
  (a) permitting a chlorinator reaction gas to enter a converging section of a venturi device, wherein said chlorinator reaction gas is at a temperature between 700° C. and 1100° C. when entering said converging section and is comprised of titanium tetrachloride;
  (b) permitting said gas to pass to a diverging section of said venturi device;
  (c) introducing liquid titanium tetrachloride into said venturi device thereby cooling said chlorinator reaction gas to a temperature between 240° C. and 280° C. to form a mixture comprised of solids and a gas; and
  (d) cycloning said mixture.

By using the present invention, one is able to suppress the formation of furans. This reduces the generation of hazardous wastes and facilitates compliance with environmental regulations. Further, by using the present invention, one is able to increase the purity of titanium dioxide products.

For a better understanding of the present invention, together with other and further embodiments, reference is made to the following description taken in conjunction with the examples.

DETAILED DESCRIPTION

The present invention is directed to the suppression of the formation of noxious substances during industrial chloride processes, particularly processes for the production of titanium dioxide. By using either the process or the apparatus of the present invention, one is able to suppress the formation of furans and other similar noxious compounds.

The present disclosure is not intended to be a treatise on the production of titanium dioxide or the treatment of furans. Readers are referred to appropriate available texts and other materials in the field for additional and detailed information on any aspect of practicing this invention.

According to one embodiment, the present invention provides an apparatus for suppressing the formation of noxious compounds during the production of titanium dioxide. The apparatus comprises a chlorinator and a nozzle that is positioned such that a chlorinator reaction gas, as well as the solids that are carried by the gas, travel through the nozzle when leaving the chlorinator (also referred to as a chlorination reactor). The phrase "chlorinator reaction gas" refers to both the gas and the solid particles that travel with the gas when leaving the chlorinator.

As persons skilled in the art are aware, when one produces titanium dioxide through the chloride process, the chlorinator reaction gas comprises the reaction products that are generated during the chlorination of titania ore, as well as substances that exist in the original ore but that have not been chemically changed during the chlorination process. For example, the chlorination reaction gas will typically contain one or more, if not all of the following substances, titanium tetrachloride, nitrogen, carbon dioxide, carbon monoxide, hydrogen chloride, ferrous chloride, manganous chloride, coke fines, unreacted ore and silica. As persons skilled in the art are aware, the precise content of the chlorination gas will depend upon the conditions established in the chlorinator, as well as the contents of the starting ore.

According to the present invention, the chlorinator will be comprised of at least one outlet duct through which the chlorinator reaction gas leaves the chlorinator. The use of chlorinators and outlet ducts in the chloride process for the production of titanium dioxide is well known to persons skilled in the art.

In this embodiment, the outlet ducts are preferably connected to the top of the chlorinator vessel. As persons skilled in the art are aware, typically, the chlorinator may, for example, be comprised of a carbon steel refractory lined vessel, and the outlet ducts may, for example, be comprised of carbon steel pipes that are lined with refractory brick, castable, or rammed refractory cement. By way of further example, in the $TiO_2$ industry, chlorinators may be on the order of twelve to twenty feet in diameter and thirty to fifty feet high. Also by way of example, ducts leaving a chlorinator are typically one and one-half to two and one-half feet in diameter.

Within the outlet duct is a nozzle. The nozzle is comprised of a converging section and a diverging section, wherein each of the converging section and the diverging section has a larger end and smaller end. The nozzle is structured such that the smaller end of the converging section is proximal to the smaller end of the diverging section. Optionally, there may be a stretch of tubing between the converging section and the diverging section. Preferably, the smaller end of the diverging section, the smaller end of the converging section and the aforementioned tubing all have the same size lumen.

In one preferred embodiment, the nozzle is a venturi device. Venturi devices facilitate the generation of highly turbulent conditions in the flow of material through them. As persons skilled in the art are aware, venturi devices are typically structured such that a substance that will reduce the temperature (referred to herein as "a temperature reducing substance") of another substance may be added to the system and put in contact with the substance that is to have its temperature reduced. As the turbulence is increased, the pressure of the gas decreases. Typically, the pressure in the duct is from about 2 to about 20 psig.

Under a particularly preferred embodiment, the venturi device is contained within a flanged pipe bolted into the main duct that leaves the chlorinator. The preferable size of the venturi device will be dependent on the size of the outlet duct into which it is inserted and the throughput of the material to be cooled. However, preferably the venturi is affixed in the duct so that all of the chlorinator reaction gas passes through it. Methods of attachment include but are not limited to bolting, wedging and/or cementing the device in place.

Venturi devices are readily available from commercial vendors. As persons skilled in the art will be aware, venturi devices have a wide range of uses, such as desuperheating steam, generating a vacuum, measuring flows and scrubbing particulates from gas streams. Commercial vendors that sell venturi devices for other applications may be contacted for designing appropriately sized venturi devices for use in connection with the present invention. Alternatively, a venturi device may be constructed by methods known to persons skilled in the art for use with the present invention. The methods include but are not limited to lining a pipe with castables and using lined brick.

By way of example, a venturi device used in connection with the present invention may have a 20–22 inch internal diameter at its largest point with a 14–16 inch internal diameter at the throat, which may be 2–4 inches long, and a slope angle of 12–14 degrees.

The methods for using venturi devices for desuperheating are well known to persons skilled in the art. According to the present invention, there are several configurations in relation to the chlorinator that can be employed when using a venturi device. For example, the venturi device may be oriented so that the chlorinator reaction gas flow is horizontal, vertically upward or vertically downward.

When using a venturi device, preferably it is structured such that a temperature reducing substance may be introduced into the highly turbulent section by a liquid spray nozzle or as a flow down. The introduction may, for example, be done: (i) upstream of the venturi, co-current with the flow of the chlorinator reaction gas in one or several nozzles; (ii) downstream of the venturi throat, counter-current to the flow of the chlorinator reaction gas in one or several nozzles; or (iii) into the throat of the venturi device itself, normal to the flow of the chlorinator reaction gas, in one or several nozzles. When using titanium tetrachloride as the temperature reducing substance, preferably a spray device will be used to introduce it to the venturi device current. A spray device is a device that converts a flow of liquids into droplets. Methods for introducing temperature cooling substances into the outlet duct of a chlorinator are well known to persons skilled in the art.

Regardless of how the temperature reducing substance is added, preferably it is reduced to very fine droplets in a turbulent gas stream in order to ensure that cooling is achieved very rapidly. The reduction of temperature through the use of a venturi device may be referred to as a "rapid quench." Preferably under the rapid quench of the present invention, the chlorinator gas is cooled to the desired temperature within 0.05 to 0.14 seconds.

Additionally, preferably downstream of the nozzle there will be an apparatus for separating the impurities and other hazardous substances from the cooled titanium tetrachloride. In one embodiment, the apparatus for separating the impurities is a cyclone. Methods for using a cyclone in the chloride process are well known to persons skilled in the art.

According to a second embodiment, the present invention comprises a process for suppressing the formation of noxious compounds that are produced during titanium dioxide production. In this process, a chlorinator reaction gas enters a nozzle, wherein the nozzle has a converging section and a diverging section as described above. Again, preferably, the nozzle is a venturi device.

In this embodiment, the chlorinator reaction gas passes from the converging section of the nozzle to the diverging section of the nozzle. While the reaction gas travels through the nozzle, a temperature reducing substance, preferably in the form of a liquid is sprayed into the nozzle under conditions that establish turbulence. The volume, temperature and rate of addition of the temperature reducing substance are preferably sufficient to reduce the gas temperature to below 280° C. Under these conditions, the temperature reducing substance cools the chlorinator reaction gas to form a mixture comprised of solids and a gas. The solids that are present after the cooling stage depend on the composition of the chlorinated ore and the temperature reducing substance. For example, the solids may contain chlorides of iron and manganese that were formed in the chlorinator, as well as zirconium and niobium oxides, which are entrained in the gas stream when the $TiCl_4$ enters the nozzle.

When the nozzle is a venturi device, the gas and solids are contacted with the temperature reducing substance. The turbulent conditions established in the venturi device cause the droplets of the temperature reducing substance to shear and to become much smaller. By being smaller than droplets that are formed with known technologies, they have more surface area, which permits a more rapid heat transfer between temperature reducing substance and the components of the chlorinator reaction gas.

Preferably, the temperature reducing substance is comprised of titanium tetrachloride in a liquid form. This titanium tetrachloride is typically not purified, i.e., it contains impurities, and may be referred to as "crude titanium tetrachloride." When crude titanium tetrachloride is used, this material may be obtained from a standard chlorination process or recycled from the process of the present invention or other processes. One benefit of using crude titanium tetrachloride in these applications as a temperature reducing substance is that impurities from the crude titanium tetrachloride may be disassociated and subsequently separated more easily. Thus, the crude titanium tetrachloride, as well as the chlorinator reaction gas is a source of $TiCl_4$ that may subsequently be used to produce $TiO_2$.

Following the introduction of the temperature reducing substance, a mixture of a gas and solids form. The solids arise from the condensation of impurity chlorides, as well as complete evaporation of the impurities in the temperature reducing substance, along with blow-over solids from the chlorinator. Although the specific compositions that form solids will depend on the composition of the starting ore and temperature reducing substance, by way of example, they may consist of the chlorides, oxides and oxychlorides of titanium, iron, manganese, aluminum, niobium, zirconium, hafnium, and vanadium. In the mixture that is present after the cooling by the temperature reducing substance, there will also typically be blowover solids, which include ore, coke and silica, as well as calcium and manganese chlorides, which are liquids and are absorbed onto the blowover solids. The materials that are gases may include titanium tetrachloride, nitrogen, carbon dioxide, carbon monoxide, hydrogen chloride, carbonyl sulfide, sulfur dioxide and hydrogen sulfide.

These solids rapidly form into a dry, free flowing powder that does not stick to the duct walls. Thus, the rapid cooling in combination with the absence of the duct deposits minimizes the time that the precursors to furans are present at furan promoting temperatures and suppresses the formation of furans.

According to the present invention, it is preferable for the chlorinator reaction to be reduced to a temperature between 240° C. and 280° C. This is the lower end of the range in which the furans may be formed. As a matter of practice, although in terms of forming a smaller amount of furans, it may be desirable to reduce the chlorinator reaction gas to significantly lower temperatures, at those lower temperatures the efficiency of the downstream separation devices will decrease, and there will be a diminished ability to recover acceptably pure titanium tetrachloride. Additionally, it is desirable to work at a temperature that allows one to avoid allowing manganese and ferrous chlorides to form from remaining in the liquid phase for too long.

Accordingly, the temperature of the gas in the duct is carefully controlled such that most of the impurity chlorides are condensed, but the titanium tetrachloride that was part of the chlorinator reaction gas remains as a vapor, and the titanium tetrachloride that is part of the temperature reducing substance and that has evaporated, remains a vapor. This status is obtained through the aforementioned rapid quench process.

Further, the rapid quench prevents the metal chlorides from remaining in the liquid phase for a significant amount of time. As noted above, this time period is preferably sufficiently low to reduce the sticky material's ability to deposit on the duct walls and to solidify. More preferably, this time period is between 0.05 and 0.14 seconds.

Preferably, the temperature of the chlorinator reaction gas when leaving the chlorinator is between 700° C. and 1100° C., more preferably between 800° C. and 1000° C. and most preferably between 850° C. and 950° C. Additionally, preferably after exposure to the temperature reducing substance, the chlorinator reaction gas is cooled to a temperature between 180° C. and 500° C., more preferably between 200° C. and 350° C., and most preferably between 240° C. and 280° C.

The temperature of the chlorinator reaction gas may be regulated by any process that is now known or that comes to be known and that from reading this disclosure, one skilled in the art would appreciate would be advantageous to use in connection with the present invention. For example, one may use a temperature sensor at the cyclone to measure its temperature. This sensor may then send a signal to control the amount of the temperature reducing substance by means of a valve, or a variable speed pump in order to keep the cyclone temperature at the target temperature.

After the cooled mixture of the solids and gas has been formed, they will be separated from each other at a separation apparatus. Preferably, this will occur at a cyclone. For example, impurity chlorides such as ferrous chloride, which is a powder at the aforementioned temperature for the cyclone, (180° C.–280° C.) will easily be separated from the gas, leaving a substantially purer stream of titanium tetrachloride vapor. The phrase "substantially purer" refers to a purity such that 90% or more of the solids have been removed. This purified stream is subsequently condensed and further processed. Methods for separating solids and liquids at a cyclone during the production of titanium dioxide are well known to persons skilled in the art.

As noted above, the temperature of the separator apparatus is preferably maintained close to or below the minimal furan formation temperature. It is also maintained above the boiling point of titanium tetrachloride. Titanium tetrachloride has an atmospheric boiling point of about 136° C., and the temperature at the cyclone is most preferably controlled to be at least 100° C. hotter. Accordingly, the temperature of the cyclone is preferably in the range of 240° C.–280° C., more preferably 260° C.–265° C. By maintaining the temperature of the cyclone in these ranges, a safety margin is provided that prevents the condensation of titanium tetrachloride. The atmosphere in the cyclone will preferably be atmospheric or a slight vacuum, e.g., 2–5 inches WG.

The solids that leave the cyclone will preferably subsequently be slurried in a solvent, e.g., water to form an acidic slurry. In the solvent, the solids will dissolve, but the oxides and carbon will be essentially insoluble.

The acidic slurry may then be neutralized, and the soluble salts of impurities such as iron and manganese will form insoluble compounds. These insoluble compounds may then be collected, by for example, filtering to form a filter cake, which can be disposed of in for example a landfill.

According to the above-described methods, one will be able to operate the chloride process and to generate solids that contain a total equivalent concentration of furans of less than 100 nanograms per kilogram. More preferably, the total equivalent concentration of the furans will be less than 40 nanograms per kilogram, even more preferably less than 20 nanograms per kilogram, still even more preferably less than 10 nanograms per kilogram and most preferably 0 or effectively 0 (<0.1) nanograms per kilogram.

By suppressing the formation of furans, the ultimate quantity of furans produced can be reduced.

EXAMPLES

The present invention is illustrated by the following examples. These are merely illustrative and should not be construed as limiting the scope of the invention. In these examples, analysis of samples was performed by looking for the presence of polychlorinated dibenzo-p-dioxins and dibenzofurans using high-resolution chromatography/high-resolution mass spectrometry at Triangle Labs.

Example 1

Without Nozzle

A chlorination reactor discharged a gaseous stream of titanium tetrachloride gas at 950° C., along with nitrogen, carbon dioxide, carbon monoxide, hydrogen chloride, ferrous chloride, manganous chloride and other minor gaseous components arising from impurities in the ore. Solids were entrained in this gas, comprising mainly coke fines, unreacted ore, and silica. Crude titanium tetrachloride was sprayed directly into the duct device using a spray device containing a spiral device to crudely atomize the gas.

The level of furans (weighted to give the Total Equivalent Concentration—TEQ) detected in the waste solids filter when a venturi device was not employed ranged from 4672 nanograms/kilogram to 8000 nanograms/kilogram.

Example 2

With Nozzle

A venturi device was installed in the hot gas outlet duct between a chlorinator discharge and a cyclone separator. The conditions were the same as in Example 1, except that the titanium tetrachloride that was used to cool the chlorinator reaction gas was sprayed into the turbulent area of a venturi device. The amount of furans in the filter cake was 32 nanograms/kilogram TEQ. The TEQ levels of furans in the filtrates were less than 20 nanograms per kilogram.

By varying the quantity of titanium tetrachloride sprayed into the venturi, one was able to control the temperature of the cooled gases at the cyclone separator outlet. When the gas stream temperature was reduced rapidly to 260° C., more impurity solids and fewer furans were formed. Solids and gas then flew to the cyclone where the majority of the solids were separated, and the gas passed forward for further cooling.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth and as follows in the scope of the appended claims.

What is claimed:

1. A process for suppressing the formation of noxious compounds produced during $TiO_2$ production, said process comprising: (a) permitting a chlorinator reaction gas to enter a nozzle, wherein said nozzle is comprised of a converging section and a diverging section; (b) permitting said chlorinator reaction gas to pass from said converging section of said nozzle to said diverging section of said nozzle; (c) introducing a temperature reducing substance into said nozzle thereby cooling said gas to form a mixture comprised of solids and a gas; and (d) separating said solids from said gas.

2. The process of claim 1, wherein said chlorinator reactor gas is comprised of reaction products generated during the chlorination of titania ore.

3. The process of claim 2, wherein said chlorinator reaction gas is further comprised of at least one substance selected from the group consisting of nitrogen, carbon dioxide, carbon monoxide, hydrogen chloride, ferrous chloride and manganous chloride.

4. The process of claim 3, wherein said chlorinator reaction gas is further comprised of at least one substance selected from the group consisting of coke fines, unreacted ore and silica.

5. The process of claim 1, wherein said temperature reducing substance is comprised of titanium tetrachloride.

6. The process of claim 1, wherein said chlorinator reaction gas enters said converging section of said nozzle at a temperature between 800° C. and 1000° C.

7. The process of claim 1, wherein said chlorinator reaction gas is cooled to a temperature between 240° C. and 280° C.

8. The process of claim 1, wherein said separating occurs at a cyclone.

9. The process of claim 1, wherein said nozzle is a venturi device.

10. A process for suppressing the formation of furans during titanium dioxide production, said method comprising: (a) permitting a chlorinator reaction gas to enter a converging section of a venturi device, wherein said chlorinator reaction gas is at a temperature between 700° C. and 1100° C. when entering said converging section and is comprised of titanium tetrachloride; (b) permitting said gas to pass to a diverging section of said venturi device; (c) introducing liquid titanium tetrachloride into said venturi device thereby cooling said chlorinator reaction gas to a temperature between 240° C. and 280° C. to form a mixture comprised of solids and a gas; and (d) cycloning said mixture.

11. The process according to claim 10, wherein said solids of (c) are filtered to form a filter product that has a total equivalent concentration of furans of less than 100 nanograms per kilogram.

12. The process according to claim 11, wherein said total equivalent concentration of furans is less than 40 nanograms per kilogram.

13. The process according to claim 12, wherein said total equivalent concentration of furans is less than 20 nanograms per kilogram.

* * * * *